Patented June 26, 1934

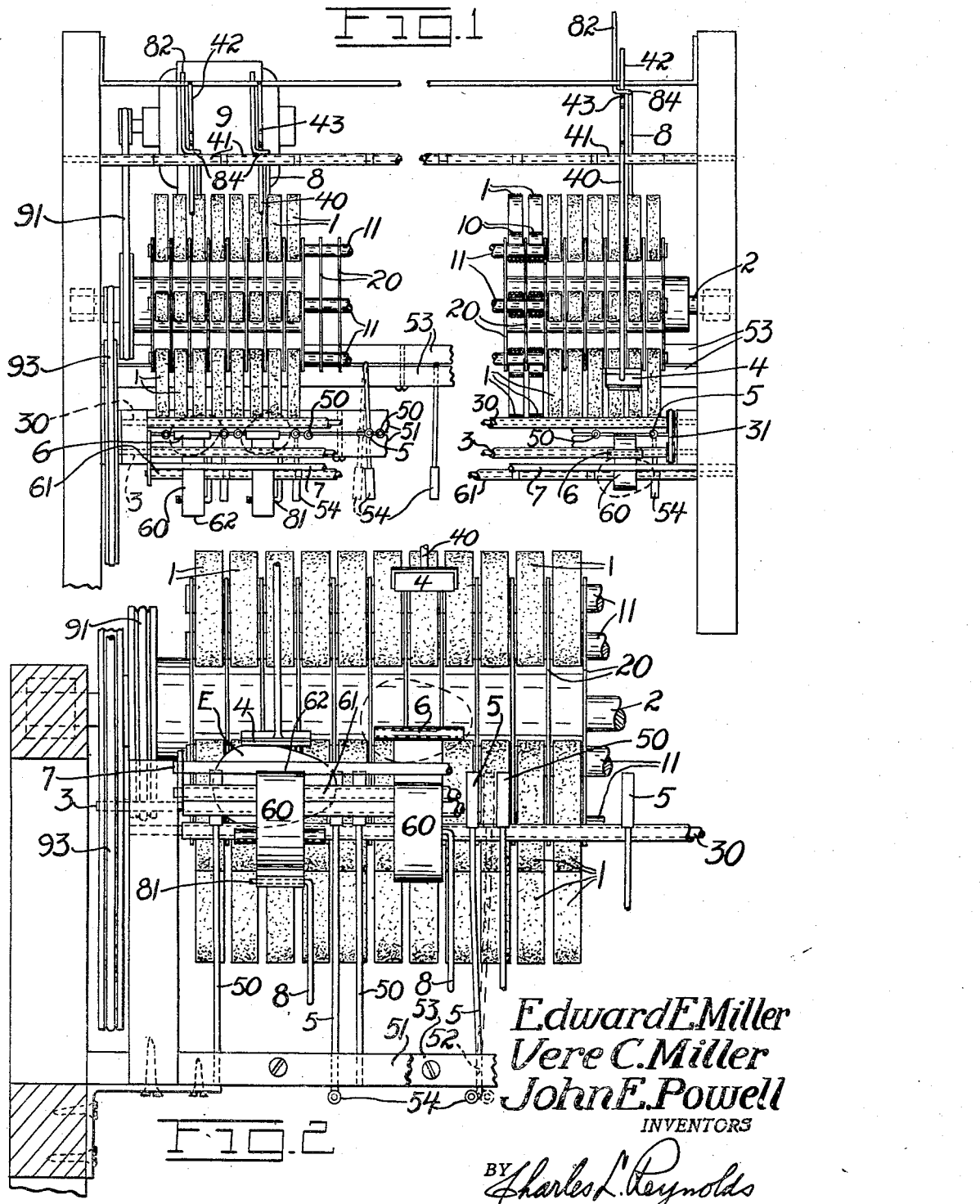

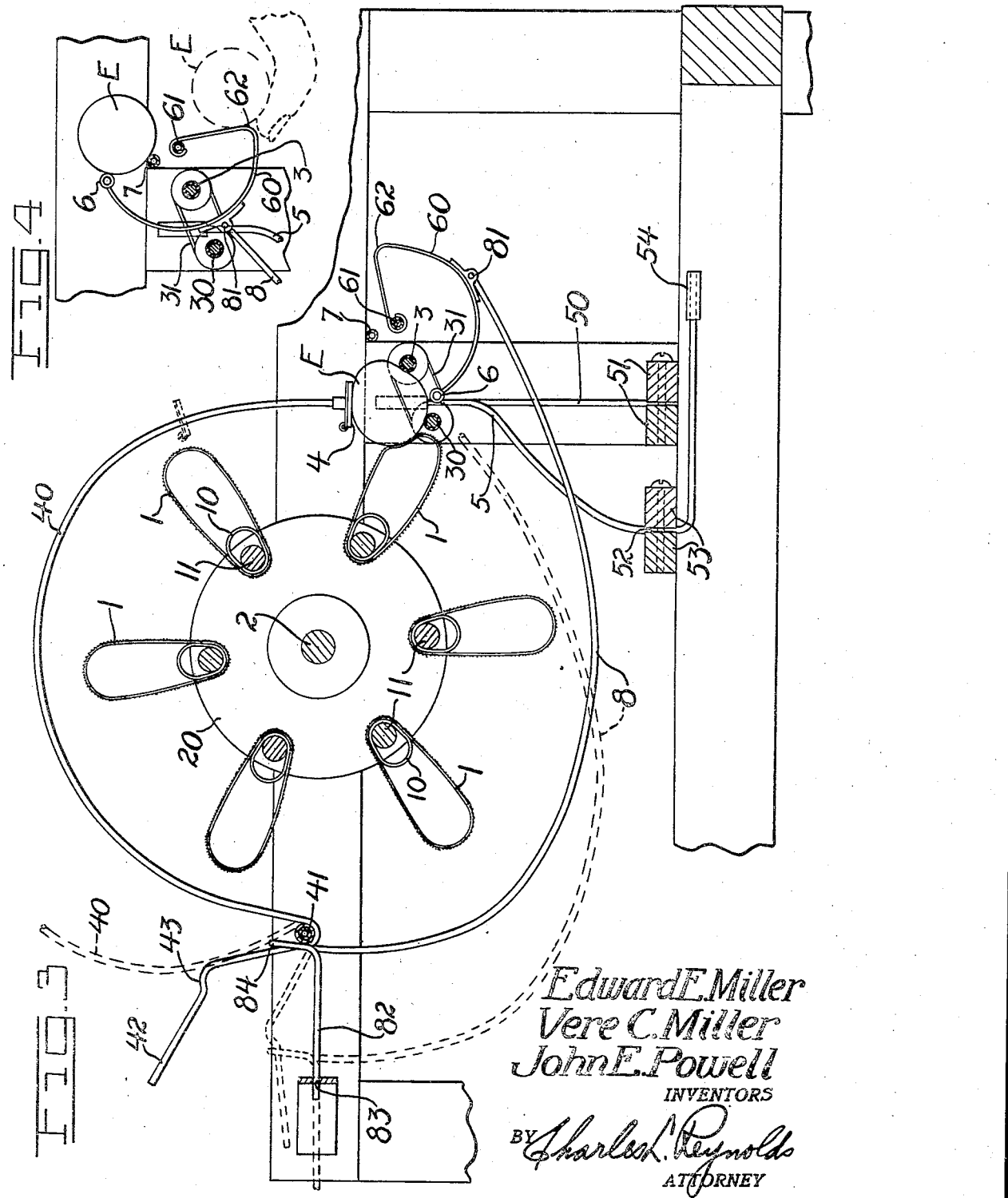

1,964,295

UNITED STATES PATENT OFFICE 1,964,295

EGG CLEANING MACHINE AND METHOD

Edward E. Miller and Vere C. Miller, Bryn Mawr, and John E. Powell, Issaquah, Wash., assignors to National Poultry Equipment Co., a corporation of Washington Application February 1, 1932, Serial No. 590,110

33 Claims. (Cl. 51—103)

Our invention relates to the cleaning of eggs. Dirty eggs are graded below clean eggs, and considerable loss to the poultryman results from dirty eggs. Washing eggs, however, has a detrimental effect upon their keeping qualities, and washed eggs are sharply graded down. Much thought has been put on the formation of nests to prevent dirtying of eggs, but the formation of the nest cannot, in any event, and under all circumstances, keep the eggs clean, for the dust arising from the chicken house and settling upon the nest surfaces will collect upon the eggs when they are first dropped and moist, and it is not practicable to keep these nests clean. It has not been found commercially practicable to wipe the eggs by hand, since this is at best a tedious process and takes too much time, besides which it is not possible, without minute care, to thoroughly clean all spots from the dirty eggs.

It is the object of our invention to provide a machine and a method whereby eggs can be cleaned, without wetting them, in a minimum of time, with little effort on the part of the poultryman, and with the assurance that all surfaces of the egg and all spots thereon will be thoroughly cleaned. In general, then, the object of our invention may be stated to be to adequately and cheaply clean eggs, to maintain for them approximately the grading to which their freshness and size entitles them.

It is also an object to provide a machine for the purpose which is adaptable to the needs of the producer, which can be set up and used in the poultry houses, and which is rugged and not liable to damage or to breakage.

It is, of course, an object to provide a machine and a method which will operate upon the egg without the possibility of damaging the egg, whether by breaking the shell, by throwing the egg off its support, or by so shaking it as to break the air cell or the yolk within the egg.

Our invention is also distinguished by various other objects, chiefly mechanical, which will be better understood as this description progresses.

Our invention may be embodied in various forms, but we have shown it herein in a form which is thoroughly practical, as has been shown by tests.

Our invention comprises the novel method, and the novel mechanical parts and combination thereof, as shown in the accompanying drawings, described in this specification, and as will be more particularly pointed out by the claims which terminate the same.

Figure 1 is a plan view of a typical machine, parts being broken away for clearer illustration.

Figure 2 is a side elevation of one end of such a machine, drawn to a somewhat larger scale than Figure 1.

Figure 3 is a transverse sectional elevation of such a machine in operation.

Figure 4 is a detail view of a portion of Figure 3, showing the egg ejecting mechanism.

Essentially our method consists in producing relative movement between a freely swinging portion of a flexible abrasive member, on the one hand, and the egg on the other hand, so that the abrasive member, or the free portion thereof, strikes the egg, gently, of course, and swipes across the surface thereof—that is to say, is drawn across the surface of the egg—so that the abrasive action wears away the dirt by the recurring action of a plurality of such abrasive members. Preferably the egg is turned slowly at the time it is acted upon by the abrasive members, upon an axis inclined relative to its major axis, so as to present all portions of the egg to the action of the abrasive members. Since there is a drag caused by the abrasive action, and since the abrasive members, if they continually strike at the same spot, would very quickly wear out, we prefer that the abrasive members be made in the form of loops, restrained to move in a definite path, but each loop capable of rotating upon its support so as to present a new surface with each successive contact with the egg.

A machine, capable of carrying out this method and embodying the principles of our invention, is shown in the drawings. Abrasive members, such as the loops 1, are suitably supported about a shaft 2 to rotate therewith past eggs E supported adjacent the path of the loops—for instance, upon the rods 3 and 30. These rods may be covered with rubber or other soft material to avoid damage to the eggs. To hold the eggs down upon the rods 3 and 30 in opposition to the tendency of the loops to throw the eggs upward therefrom, we may employ holddown means such as the pad 4, supported upon a goose neck arm 40 pivoted at the opposite side of the machine at 41. An arm 42, having a raised portion 43, is formed as part of the arm 40 for a purpose which will appear hereafter.

The means by which the loops 1 are supported for rotation from the shaft 2 are largely immaterial. We prefer that they be spaced both longitudinally of the shaft and angularly thereabout, and as a convenient means of grouping them we provide a series of disks 20 secured upon the shaft 2 and acting to space groups of the loops, which are angularly spaced within the groups. To hold these loops to the disk we may provide rods 11 extending through the several disks and through the aligned loops. These rods 11 are of considerably less diameter than the loop itself, and consequently the loop is left with a long free portion which, with the action of centrifugal force, swings outwardly of the disks and of the rods 11. This action may be assisted and the turning of the loops may be facilitated by the provision of considerably smaller loops 10 of considerably greater mass than the loops 1—for instance, the loops 1 may be of paper or cloth, coated with a suitable abrasive, while the loops 10 may be sections of a rubber tube or hose. Thus they are not so readily deformed as the loops 1, and serve to hold the loops somewhat open, and, also, to assist in throwing them forward and in giving an effective mass behind them to strike a suitable blow to the eggs, and to cause the free end of the loop 1 to be drawn sharply across the surface of the eggs. Like the loops 1, the loops 10 are held in place by the rods 11 which pass therethrough.

In addition to the rods 3 and 30 and the hold-down pad 4, the eggs are held in position by upright posts 5 and 50. The posts 50 are fixed in position, supported from the rails 51, whereas the posts 5 are offset and pivotally received at 52 in the rails 53, or both might be adjustable. A handle 54 extends outwardly from the pivot at 52 to enable adjustment of the post 5 toward and from the fixed post 50 with which it is paired, and from which it is spaced a distance somewhat less than the major axis of the egg which is to be received between them. Since eggs will vary in length it is necessary to adjust the spacing between these posts.

The rods 3 and 30 are preferably rotatable shafts extending parallel to the shaft 2, and these shafts 3 and 30 rotate each in the same direction, being connected by a sprocket chain or belt 31 extending over suitable pulleys or sprocket wheels at one end of the shafts. Since the egg, resting upon these rotating shafts, cannot be placed with its end between the posts 5 and 50, one end of the egg lies at the near side of the post 50, for example, as may be seen at the left in Figure 2, while the opposite end, in this case the larger end, lies at the far side of the adjustable post 5. As the shafts 3 and 30 rotate, they tend to rotate the egg, and the end at the left in Figure 2—that is, the large end—will eventually pass to the near side of the post 5, and the small end, at the right, will pass at the same time to the far side of the fixed post 50, and the egg will continue to rotate. Thus it will successively, though rather slowly as compared to the rate of rotation of the loops 1, change its position, rotating in effect about an axis which is inclined with respect to the major axis of the egg. By this action all parts of the egg are exposed to the abrasive action, even to the tip at each end.

When the egg has been cleaned, the ejector 6 is brought into play. This is mounted upon a recurved arm 60 pivoted at 61 adjacent the shaft 30, and when the point 62 of the member 60 is engaged by the back side of a person's fingers, a downward pressure thereon will move the ejector 6 upwardly from beneath the egg, lifting it and carrying it over the shaft 30 and a rod 7, whereupon it drops into the waiting hand of the operator, as shown in Figure 4.

The weight of the hold-down pad 4 is not sufficiently great to prevent ejection of the egg, but in order to hold it upraised to permit free insertion of the next egg, we may provide means cooperating between the ejector and the hold-down pad to hold this pad 4 upraised. Such means, as shown, comprise a link 8 pivoted at 81 to the member 60 and extending beneath the shaft 2 to the far side of the machine, where its end 82 is received in a horizontal guide at 83. Near the end 82 it is looped upward over the extension 42 of the hold-down rod 40, as is indicated at 84.

Pressure upon the point 62 moves the point 81 rearwardly, and this, acting through the loop 84, presses down upon the extension 42 and raises the member 40 with its pad 4, until the loop 84 passes over the portion 43 of the extension 42, whereupon the member 40 is locked in upraised position. It can be unlocked, however, and allowed to drop, merely by depressing the ejector 6 with the next egg, this causing forward movement of the link 8. The two positions of the parts are shown in Figures 3 and 4.

The drive mechanism for the machine may be any which is found suitable. Thus we have shown a motor 9 driving the shaft 2 through a belt 91, the rotation of the shaft 2 being comparatively rapid, and from this shaft a belt 93 drives the shaft 3 at a considerably lower rate of speed. The shafts 3 and 30 are connected by the belt 31 as previously described.

What we claim as our invention is:

1. In an egg-cleaning machine, a plurality of flexible abrasive open loops and means supporting the same to swing freely and to rotate each relative to its immediate support, and means to move the same past an egg presented thereto, to swipe the egg.

2. In an egg-cleaning machine, a plurality of flexible abrasive loops, means of less diameter supporting said loops, to maintain the latter with spaced sides and curved ends, and means to move the loops and their supports past an egg presented thereto, to swipe across the egg's surface.

3. In an egg-cleaning machine, a plurality of flexible abrasive open loops supported to swing freely, means to move the same in succession past an egg presented thereto, to swipe across a portion of the egg's surface, and means to support and rotate the egg, to present different portions of its surface to said loops.

4. In an egg-cleaning machine, a plurality of flexible abrasive members supported to swing freely, means to move the same in succession past an egg presented thereto, to swipe across a portion of the egg's surface, means to support and rotate the egg about an axis inclined relative to its major axis, and means to adjust the relative inclination of the two axes.

5. In an egg-cleaning machine, a plurality of flexible abrasive loops of slight mass, flexible loops of less diameter but greater mass disposed within the abrasive loops, means within the heavier loop about which it may swing and rotate, and means to rotate the several means before-mentioned past an egg, to swipe the abrasive loop across the egg's surface.

6. The method of cleaning eggs which consists in rapidly moving across the surface thereof to be cleaned free portions of flexible abrasive members, and moving each such member relative to its support, in the direction of its length, by the frictional engagement thereof with the egg.

7. The method of cleaning eggs which consists in throwing outwardly by centrifugal force free portions of a freely supported flexible abrasive open loop, and in presenting to such loop the surface of an egg to be cleaned, to move the same circumferentially by the frictional engagement thereof with the egg's surface.

8. The method of cleaning eggs which consists in rapidly moving a plurality of free portions of flexible abrasive members, presenting an egg to such members, and slowly rotating the egg about its own major axis and simultaneously about an axis inclined relative thereto, to present the several portions of its surface in turn to the abrasive members.

9. The method of cleaning eggs which consists in rapidly moving a plurality of freely supported flexible abrasive members, presenting an egg to such members in such manner as to move said members each relative to its support by the drag created by abrasive contact of the member with the egg, and slowly rotating the egg upon an axis inclined relative to the egg's major axis.

10. The method of cleaning eggs which consists in rotating to throw outwardly by centrifugal force free portions of open flexible loops of abrasive material, and presenting to such loops the surface of an egg to be cleaned, thereby to draw the loop across such surface and to advance the loop circumferentially, to present subsequently a fresh portion to the egg.

11. In an egg-cleaning machine, means to support an egg, a plurality of abrasive loops supported to swing freely and free to advance circumferentially, and means to draw each in succession across the surface of the egg thus supported, by the frictional contact with the egg's surface to be deflected and advanced circumferentially.

12. In an egg-cleaning machine, means to support an egg, a plurality of freely swinging abrasive members, means to draw each in succession across the surface of the egg thus supported, and means positioned for operation by a hand disposed to receive the egg, to lift it from said support.

13. In an egg-cleaning machine, means to support an egg, a plurality of freely swinging abrasive members, means to draw each in succession across the surface of the egg thus supported, means to hold down the egg upon said support, and means connected to said hold-down means, to raise the same and to lift the egg from the support.

14. In an egg-cleaning machine, means to support an egg, a plurality of freely swinging abrasive members, means to draw each in succession across the surface of the egg thus supported, means to hold down the egg upon said support, means to lift the egg from the support, and operatively connected to said hold-down means to raise the same simultaneously, and means to lock the hold-down means in such upraised position, and releasable by the presentation of another egg upon said support.

15. In an egg-cleaning machine, two parallel horizontal rods spaced to support an egg thereon, two upright posts spaced less than the major axis of an egg, and disposed to contact an egg which is supported on said rods inside its ends, and at opposite sides, a plurality of abrasive members, means to move the latter rapidly past an egg thus supported, to swipe its surface, and means to rotate the egg.

16. In an egg-cleaning machine, two parallel horizontal rods spaced to support an egg thereon, two upright posts spaced less than the major axis of an egg, and disposed to contact an egg which is supported on said rods inside its ends, and at opposite sides, a plurality of abrasive members, means to move the latter rapidly past an egg thus supported, to swipe its surface, and means to rotate said rods, thereby to rotate the egg about an axis inclined relative to its major axis, and simultaneously about such major axis.

17. In an egg-cleaning machine, two parallel horizontal rods spaced to support an egg thereon, two upright posts spaced less than the major axis of an egg, and disposed to contact an egg supported on said rods inside its ends, and at opposite sides, means to vary the spacing between said posts, a plurality of abrasive members, means to move the latter rapidly past an egg thus supported, to swipe its surface, and means to rotate the egg.

18. In an egg-cleaning machine, an abrasive element comprising a plurality of flexible abrasive loops, a shaft, means disposed outwardly of said shaft about which said abrasive loops are free to rotate independently of the shaft, and means to rotate the shaft and said first means with their abrasive loops to throw the free portions thereof centrifugally outward.

19. In an egg-cleaning machine, an abrasive element comprising a plurality of flexible abrasive loops, each of a length less than the length of an egg, a shaft, means of less diameter than the loops extending parallel to and spaced outwardly from the shaft and angularly relative to each other to support the loops close together, to encompass in the length of several loops the length of an egg, means to rotate the shaft and loops to throw the latter outwardly by centrifugal force, and means to hold an egg in position to be swiped by the several loops as they rotate.

20. In an egg-cleaning machine, an abrasive element comprising a plurality of disks spaced less than the length of an egg, a rotative shaft whereon said disks are secured, a plurality of rods angularly spaced about the disks and removably extending therethrough, and abrasive loops disposed between adjacent disks, the rods extending through a plurality of loops, and the free portions of the loops swinging outwardly of the disks by centrifugal force upon rotation of the shaft and associated members.

21. In an egg-cleaning machine, a loop of flexible abrasive material, supporting means therefor passing through the loop, the loop being loosely received thereon for rotation relative to the support, upon the loop encountering frictional resistance, and means to move the support and loop past an egg presented thereto, to swipe along the surface of the egg.

22. In an egg-cleaning machine, a loop of flexible material having an outer abrasive surface, supporting means therefor passing through the loop, the loop being loosely received thereon for rotation about the support, upon the loop encountering frictional resistance, and means to rotate the support and loop about an axis, to centrifugally hold the loop out, in position to swipe along the surface of an egg presented thereto, and by frictional engagement of such surface to be rotated relative to its support.

23. In an egg-cleaning machine, a loop of flexible material having an outer abrasive surface, supporting means therefor passing through the loop, the loop being loosely received thereon for rotation about the support, upon the loop encountering frictional resistance, means to rotate the support and loop about an axis, to centrifugally hold the loop out, in position to swipe along the surface of an egg presented thereto, and by frictional engagement of such surface to be rotated relative to its support, and a stiffer loop interposed between the flexible loop and its support, of less diameter than the flexible loop, to hold the sides of the latter distended, and to lessen friction between the flexible loop and its support.

24. In an egg-cleaning machine, a flexible abrasive loop, means supporting the same for rotation, to throw the loop centrifugally outward, and means received within the loop, and rotating with said support, to hold the sides thereof separated while thus thrown outward.

25. In an egg-cleaning machine, a plurality of closed loops of flexible material having an abrasive outer surface, each loop of a fraction the length of an egg, and together encompassing the egg's length, means to hold the opposite sides of each loop apart, and to maintain their ends curved, and means to support the several loops and said means and to rotate them to throw them centrifugally outward, to engage the surface of an egg presented sidewise thereto.

26. In an egg-cleaning machine, a plurality of open loops of flexible material having an abrasive outer surface, each loop of a fraction the length of an egg, and together encompassing the egg's length, means to support each loop independently of the other loops, each for rotation about its immediate support, and means to rotate all the supports and loops to throw such loops centrifugally outward, to engage the surface of an egg presented thereto.

27. In an egg-cleaning machine, a plurality of flexible abrasive members supported to swing freely, means to move the same in succession past an egg presented thereto, to swipe across a portion of the egg's surface, means to support and rotate the egg about its major axis, and means to maintain the egg's major axis, while the egg is rotating, inclined relative to a line intersecting such axis and parallel to the path of movement of the abrasive members.

28. In an egg-cleaning machine, a plurality of flexible abrasive members supported to swing freely, means to move the same in succession past an egg presented thereto, to swipe across a portion of the egg's surface, means to support and rotate the egg about its major axis, and means to maintain the egg's major axis, while the egg is rotating, inclined relative to a line intersecting such axis and parallel to the path of movement of the abrasive members, and to permit the egg's major axis to rotate about such line.

29. In an egg-cleaning machine, a plurality of flexible abrasive loops of slight mass and of a length a fraction the length of an egg, a loop of less diameter, the same length, and greater mass disposed within each abrasive loop, means within each heavier loop about which it may swing and rotate, means to assemble the several abrasive loops in closely-spaced relation to encompass collectively the length of an egg, and means to move the several means before-mentioned past an egg, to swipe the several abrasive loops across the egg's surface.

30. In an egg-cleaning machine, a plurality of disks spaced apart less than the length of an egg, a rotative shaft whereon said disks are secured, a plurality of means angularly spaced about said disks, an abrasive loop supported by each of said means, between adjacent disks, and each of greater diameter than such supporting means, whereby the free portion of each loop is thrown outward centrifugally upon rotation of the shaft, and means to position an egg for engagement by the outwardly thrown portion of a plurality of loops, longitudinally of the shaft.

31. In an egg-cleaning machine, means to support an egg for rotation, two upright posts spaced less than the major axis of an egg and disposed to contact an egg which is supported on said support inside its ends, and at opposite sides, a plurality of abrasive members, and means to move the same rapidly past an egg thus supported, to swipe its surface and to tend to rotate the same.

32. In an egg-cleaning machine, means to support an egg for rotation, two upright posts spaced less than the major axis of an egg and disposed to contact an egg which is supported on said support inside its ends, and at opposite sides, a plurality of abrasive members, means to move the same rapidly past an egg thus supported, to swipe its surface and to tend to rotate the same, and means positively to rotate the egg.

33. In an egg-cleaning machine, means to support an egg for rotation, two upright posts spaced less than the major axis of an egg and disposed to contact an egg which is supported on said support inside its ends, and at opposite sides, means to vary the spacing between said posts, a plurality of abrasive members, and means to move the same rapidly past an egg thus supported, to swipe its surface and to tend to rotate the same.

EDWARD E. MILLER.
VERE C. MILLER.
JOHN E. POWELL.